United States Patent [19]
Redmond

[11] Patent Number: 5,098,346
[45] Date of Patent: Mar. 24, 1992

[54] SPROCKET

[75] Inventor: John D. Redmond, Littleton, Colo.

[73] Assignee: The Gates Rubber Company, Denver, Colo.

[21] Appl. No.: 509,009

[22] Filed: Apr. 13, 1990

[51] Int. Cl.⁵ .............................................. F16H 55/06
[52] U.S. Cl. .................................................... 474/161
[58] Field of Search ............... 474/161, 152, 153, 160; 29/893.37

[56] References Cited

U.S. PATENT DOCUMENTS

| | | | |
|---|---|---|---|
| 3,304,924 | 2/1967 | Dolza | 474/161 |
| 3,756,091 | 9/1973 | Miller | 74/231 |
| 3,774,465 | 11/1973 | Brasseur | 474/161 |
| 3,964,328 | 6/1976 | Redmond, Jr. | 74/231 |
| 4,078,445 | 3/1978 | Kiser, Jr. | 29/893.37 |
| 4,244,847 | 1/1981 | Posiviata et al. | 260/17.4 |
| 4,366,609 | 1/1983 | Speer | 474/177 |
| 4,458,547 | 7/1984 | Fina | 74/460 |
| 4,514,179 | 4/1985 | Skura | 474/204 |
| 4,589,860 | 5/1986 | Brandenstein et al. | 474/152 |
| 4,681,558 | 7/1987 | Rausch | 474/263 |
| 4,717,370 | 1/1988 | Rohrig | 474/161 |

FOREIGN PATENT DOCUMENTS 3123246 12/1982 Fed. Rep. of Germany ...... 474/153
57-6154 1/1982 Japan .

OTHER PUBLICATIONS

Plastic Gears, *Machine Design*, Oct. 13, 1988, p. 34.
More Bite for Plastic Gears, *Machine Design*, Jan. 21, 1988, pp. 75-80.

*Primary Examiner*—Ramon S. Britts
*Assistant Examiner*—Roger J. Schoeppel
*Attorney, Agent, or Firm*—H. W. Oberg; C. H. Castleman, Jr.; J. L. Isaac

[57] ABSTRACT

A toothed sprocket with rim portion made of a first composite material of discontinuous fiber disposed in a plastic matrix and where the teeth of the rim portion are covered with an encircling layer of a second composite material that includes a fibrous material and an elastomeric matrix and fibers embedded in the matrix.

10 Claims, 2 Drawing Sheets

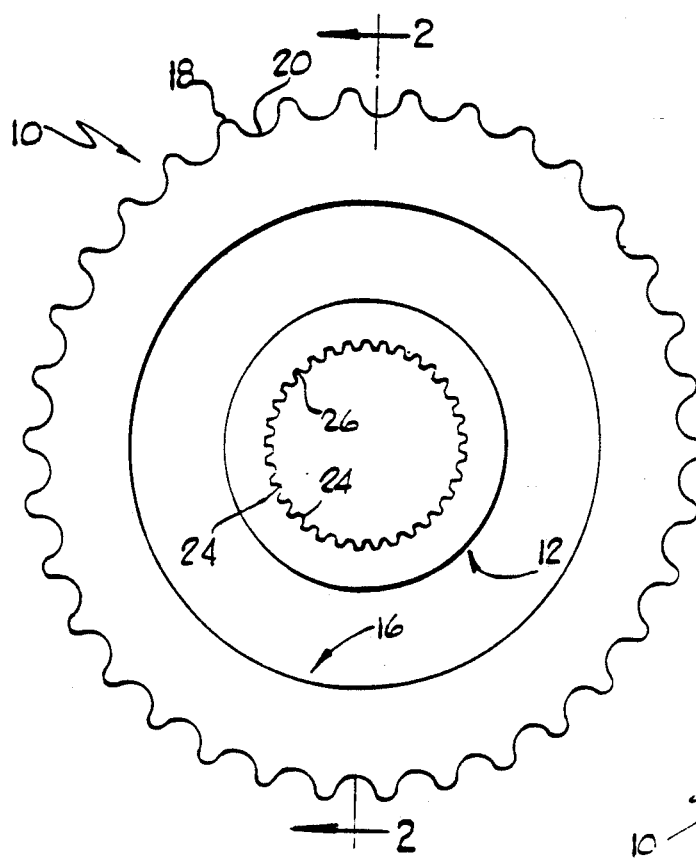
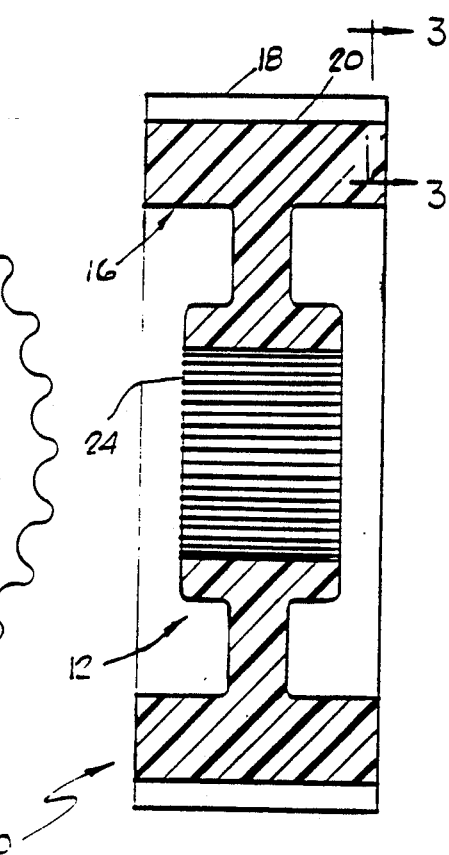
FIG.1    FIG.2
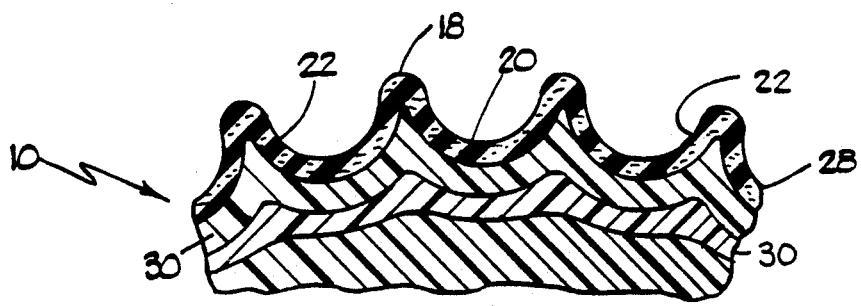
FIG.3

SPROCKET

BACKGROUND OF THE INVENTION

The invention relates to machine elements and mechanisms but more particularly, the invention relates to an improved sprocket for use with a toothed, power transmission belt, where the sprocket is at least partially formed with a plurality of a plastic-fiber composite material.

There are several types of power transmission wheels such as gear wheels, sprocket wheels, and pulley wheels which have a power transmission surface or layer that is formed from a composite material of plastic and embedded fibers. Some power transmission wheels are formed totally of a composite material while others may include a metallic insert which forms a hub portion and where the composite material is used on a rim portion. An example of such composite materials include fabrics impregnated with a phenolic resin. Another composite material that has the advantage of being capable of being molded by a thermal plastic injection molding is a composite material of nylon reinforced with milled glass fibers having a length of 1/16 in. or less. While a thermal plastic injected nylon material containing a 40 weight percent of nylon fiber is effective for use in many power transmission wheel applications, such composite materials are not suited for long life in some gritty and abrasive environment applications where it is customary to use hard materials such as cast iron, steel, powdered metal or aluminum coated with a hard, chrome oxide plating. A characteristic of composites with glass fibers used in some gritty environments is that in time, the plastic matrix is worn away exposing end portions of fiber juxtaposed the power transmission surface of the power transmission wheel such as a sprocket that may lead to early failure of a component part of a drive system such as a power transmission belt. The exposed fibers being substantially harder than the belt material and pointed, abraid the surface of the belt teeth and cause early belt failure.

Examples of various types of plastic gears and problems associated therewith are summarized in the Jan. 21, 1988 and Oct. 13, 1988 issues of Machine Design.

SUMMARY OF THE INVENTION

A sprocket is provided in accordance with the invention and has a hub portion and a rim portion. The rim portion is of a composite material that is covered with a surface layer or layers that includes an embedded, fibrous material such as discontinuous fibers and woven fabrics or combinations thereof where the fibrous material is treated with or embedded in an elastomer. The surface layer follows the contour of the sprocket teeth and provides the teeth with some resiliency and a wear resistant surface particularly in a gritty and abrasive environment.

An object of the invention is to provide a sprocket using a plastic, fiber, elastomer composite where hard materials such as iron, steel, or plated aluminum were formerly used.

Another object of the invention is to provide a sprocket that is compatible with a toothed belt of a power transmission system when operating in a gritty environment.

Yet another object of the invention is to eliminate exposure of end portions of embedded glass fiber juxtaposed flank surfaces of teeth of a sprocket wheel that includes a plastic fiberglass composite.

An advantage of the invention is that a moldable fiber-polymer composite material can be used in combination with a surface layer incorporating an elastomer in power transmission systems where hard materials such as metals were formerly used.

Still another advantage of the invention is that in a sprocket and toothed belt combination of a power transmission system, sprockets of the invention having teeth of composite material covered with a surface layer of fibrous material treated or embedded in an elastomeric material exhibit substantially improved performance over sprockets having teeth formed solely of a plastic-fiber composite.

These and other advantages of the invention will be realized after reviewing the drawings and description thereof wherein:

FIG. 1 is a front view of a sprocket made in accordance with the invention:

FIG. 2 is a view taken along the line 2—2 of FIG. 1;

FIG. 3 is an enlarged partial view taken along the line 3—3 of FIG. 2;

DESCRIPTION OF PREFERRED EMBODIMENTS

Figure 4:
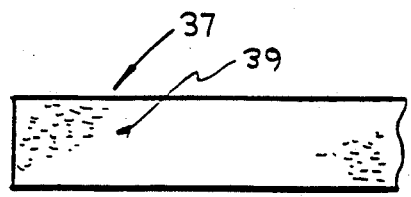
FIG. 4 is a top view of a strip of uncured elastomeric material with embedded, discontinuous fiber.

Referring to FIGS. 1-3, a sprocket 10 of the invention is provided for a toothed belt. The exemplary sprocket has a hub portion 12 and a rim portion 16. A plurality of belt engaging teeth 18 and grooves 20 are formed in the rim where the teeth have flank surfaces 22. A plurality of internal teeth 24 in the form of a spline are formed in the hub portion. The teeth 24 have flank surfaces 26 for engaging and receiving power from a splined shaft, not shown.

The sprocket is formed with at least one encircling outer, surface layer 28 of material that covers and follows the contour of the teeth. While various types of plastic-fiber components can be used to form the rim portion, there are optionally, several inner, successive encircling inner layers 30 of plastic-fiber composite material as particularly illustrated in FIG. 3.

The composite material of the inner layer has a plastic matrix with an embedded fibrous material. The plastic-fiber composite preferably has a tensile strength of at least 35,000 psi as derived from the combination of the plastic and embedded fiber and where the fiber is of the type with lengths of at least 0.5 inches. The plastic matrix may be of any desired type such as epoxy and vinyl ester. Similarly the embedded fiber may be of any desired type such as aramid fiber, fiberglass and carbon fiber.

Figure 6:
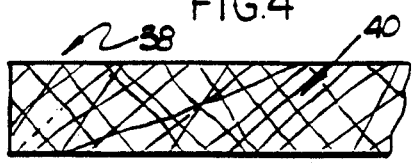
FIG. 6 is a top view of a strip of uncured plastic-fiber composite with random orientation of discontinuous fiber.
Figure 7:
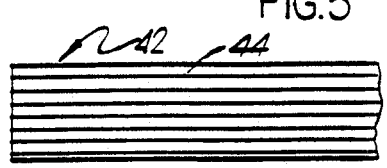
FIG. 7 is a view similar to FIG. 6 but showing a composite material with oriented fibers extending throughout the length of the strip.

The fiber of the inner, encircling layer of plastic-fiber composite may be randomly oriented as illustrated by the strip 38 of FIG. 6, or the fiber may be directionally oriented as illustrated by the strip 42 of FIG. 7. In either case, the encircling layer juxtaposed the teeth generally follows the contour of the teeth. Different inner encircling layers may be used. For example, the encircling layer at the hub portion may be of randomly oriented fiber, and the encircling layers at the rim portion may be with directionally oriented fiber.

While various plastic-fiber composite combinations may be used, composites sold under the trademark Lytex as manufactured by Quantum Composites, Inc. have been shown to be effective for the optional, inner encircling layers of the sprocket of the invention. Lytex Product No. 9063 is for randomly oriented fiber glass disposed in an epoxy matrix, and Lytex Product No. 4105 is for 18 in. continuous fiberglass directionally oriented and disposed in an epoxy matrix. The advantage of these materials is that they can be loaded into a plastic matrix at higher weight percents that are unattainable with the milled glass fibers. Weight percents of sixty percent (60%) are attainable with the ½ in. glass fiber to yield a composite having a tensile strength of 35,000 psi. A 60% by weight of 2 in. glass fiber yields a tensile strength of approximately 44,000 psi. Composites with the 18 in. continuous fiberglass approach tensile strengths of infinite fiber lengths. A seventy percent (70%) by weight is possible with the substantially continuous fiber where the tensile strength may be 100,000 psi or greater. The advantage of these composite materials is that they are equal to or greater than the tensile strength of cast or ductile iron which is considered to be a desired material for sprockets or splines.

Figure 5:
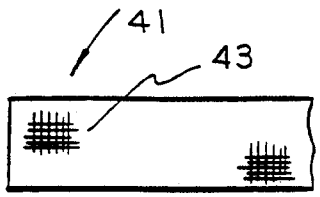
FIG. 5 is a top view of a strip of fabric treated with uncured elastomeric material.

The fiber of the outer, encircling layer of elastomer-fiber composite may be randomly oriented as illustrated by the strip 37 of FIG. 4, or the fiber may be in the form of square woven fabric as illustrated by the strip 41 of FIG. 5.

The outer surface layer is treated with or embedded in an elastomer which forms a matrix that is softer than the glass-fiber composite. The chosen elastomer may be of any desired type such as natural rubber, synthetic rubber and blends thereof, and may include hardeners such as phenolic and adhesives such as RFL. The fiber of the elastomer-fiber composite may also be of any desired type provided that it does not exhibit abrasive characteristics at the surface of the sprocket teeth to an engaging member such as a toothed belt. Examples of such fiber include the naturally occurring cellulosic fibers, nylon, polyester, and aramid. Preferably, the fiber is chosen to be compatible with the surface of a power transmission belt with which the sprocket is to be used.

Whatever the chosen combination of elastomer and fiber, the stock so compounded should have a high compressive modulus to receive the loads induced by the power transmission belt. An example of an elastomer-fiber composite is of the type that may be used in the invention is disclosed and U.S. Pat. No. 4,244,847 to Posiviata et al. An example of a suitable square woven fabric that may be used in the elastomer fiber composite is a nylon fabric disclosed in U.S. Pat. No. 4,514,179 to Skura. The fiber stock of Posiviata et al may be combined with the fabric of Skura by skim coating using known methods, or, separate strips of each material may be used. Square woven nylon fabric may be treated with an adhesive such as RFL and then dipped in an elastomeric solution such as of latex or neoprene. A suitable combination of materials is a strip 37 of rubber elastomer with fiber 39 of the aramid type followed by a strip of rubber elastomer 41 having embedded fiber of the nylon type. Another suitable and more preferable combination is a strip of nylon square woven fabric that is treated with an elastomer such as neoprene cement or latex.

Method

Figure 8:
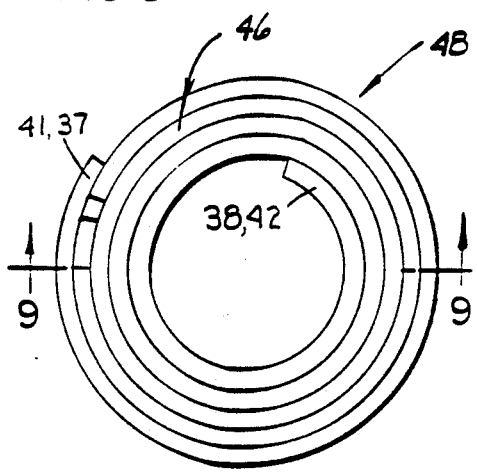
FIG. 8 is a front view mold preform where a strip of FIG. 4 or 5 is spirally wound in in combination with a strip of FIGS. 6 or 7 in volute fashion forming encircling layers.
Figure 9:
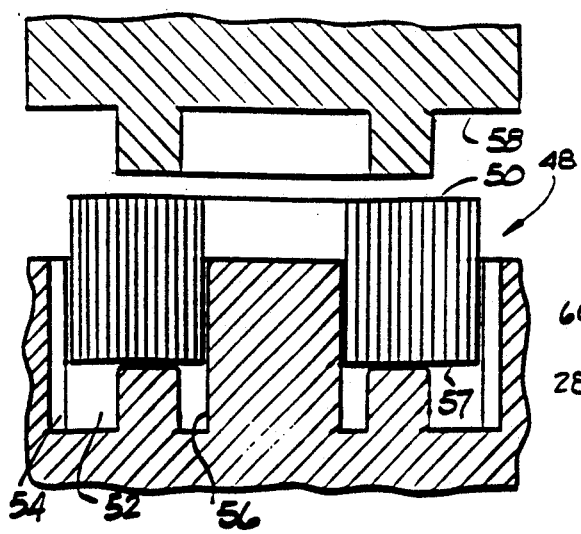
FIG. 9 is a cross-sectional view taken in the direction of 9—9 of FIG. 8 and showing the preform inserted into a mold cavity.
Figure 10:
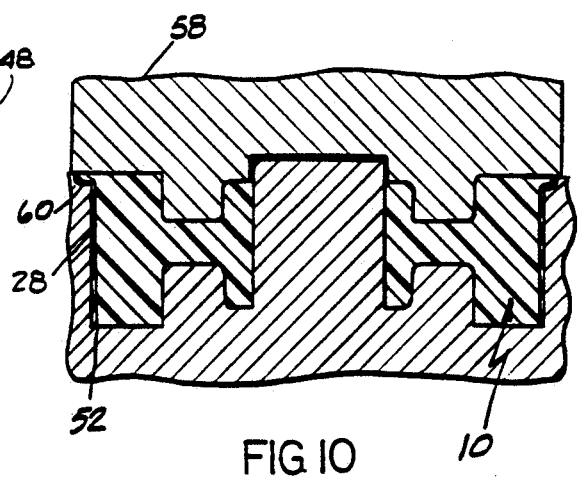
FIG. 10 is a view similar to FIG. 9 and showing the preform molded in a compression mold cavity to define the sprocket wheel of FIG. 1.

The sprocket of FIGS. 1-3 is made in accordance with the method as illustrated in FIGS. 4-10. A strip 38 of uncured composite having randomly disbursed fibers 40, or a strip 42 of uncured plastic-fiber composite having directionally oriented fibers 44, or combinations thereof, may be used. A sprocket is made by encircling at least one or more combinations of strips 38, 42 of plastic-fiber composite material such as by spiraling in volute fashion and thereby applying together a plurality of generally concentric layers 46. An outer encircling strip of elastomer-fiber composite or combinations of strips of elastomer fiber composites are spiralled in volute fashion over the plastic-fiber composite to form a cylindrically shaped mold preform 48 having oppositely facing sides 50 and 57. The preform such as shown in FIG. 8 is placed in a mold cavity 52 for a sprocket that has a rim portion 54 and a hub portion 56. Optionally, the strip 41, 37 may be corrugated to generally follow the desired tooth shape. The preform 50 is pressed by means of mold part 58 on at least one side of the preform 50 which reshapes the preform to fill the mold cavity as shown in FIG. 10. The encircling layering of the volute between the hub and rim substantially is disrupted by the pressing operation; however, the encircling layering remains substantially intact at the hub and rim portions. The mold cavity and preform are heated which cures the epoxy material of the plastic-fiber composite to define a molded power transmission wheel with an outer encircling surface layer 38 of elastomer fiber composite material. The molding process forms a plurality of spaced, circumjacent teeth in the rim portion that are covered with a layer of elastomer-fiber composite and, optionally, the molding may form an integral radial flange 60 adjacent to at least one side of the teeth as is illustrated in FIG. 10. When a splined shaft is desired, the teeth are internally formed along the hub during the molding process.

To illustrate the improvements derived from the invention, several different sprockets were manufactured. All sprockets had substantially the same configuration and were tested as part of a power transmission system where the sprocket teeth and belt teeth were of the type as disclosed in U.S. Pat. No. 3,756,091 to Miller and where the belt was of the cast polyurethane type with an elastomer free surface as disclosed in U.S. Pat. No. 3,964,328 to Redmond. The various types of sprockets and belt were tested on a motorcycle for both the driver and driven sprockets. After 10,000 miles of testing, the sprockets of the invention were still serviceable and the belt exhibited no abrasive wear.

What is claimed is:

1. In a sprocket with (1) a toothed rim portion that includes a first composite material of fiber dispersed in a plastic matrix and (2) a hub portion, and wherein the improvement comprises:

at least one contoured encircling surface layer of a second composite material of an elastomer and a fibrous material free of glass fiber covering teeth of the toothed rim portion wherein the elastomer defines an elastomeric matrix having embedded fibrous material.

2. The sprocket as claimed in claim 1 and wherein the first composite material includes a plurality of successive encircling layers.

3. The sprocket as claimed in claim 2 wherein the plurality of successive encircling layers of the first composite material are generally in the form of a volute.

4. The sprocket as claimed in claim 3 and wherein the hub portion is also of the first composite material and has a plurality of spaced circumjacent internal teeth that define a spline.

5. The sprocket as claimed in claim 1 wherein the fibers in the encircling surface layer of second composite material include discontinuous aramid fibers.

6. The sprocket as claimed in claim 1 wherein the fibers in the encircling surface layer of second composite material include a nylon fabric.

7. The sprocket as claimed in claim 1 wherein the encircling surface layer of second composite material includes a first layer of embedded, discontinuous aramid fibers and a second layer of embedded nylon fabric.

8. The sprocket as claimed in claim 6 wherein the fabric is square woven.

9. The sprocket as claimed in claim 1 wherein the first composite material includes fiber dispersed in a plastic matrix selected from the group consisting of an epoxy and vinylester.

10. The sprocket as claimed in claim 1 wherein the first composite material has fiber dispersed in a plastic matrix said fibers having a length of at least 0.5 in. and occupying at least 60 percent by volume of the plastic matrix.

* * * * *